US010649490B2

(12) United States Patent
Blattel

(10) Patent No.: US 10,649,490 B2
(45) Date of Patent: May 12, 2020

(54) COMPUTER CASE, PLATFORM, FOLD-OUT SHADE AND LOCK SET SCREW

(71) Applicant: David Blattel, Chatsworth, CA (US)

(72) Inventor: David Blattel, Chatsworth, CA (US)

(*) Notice: Subject to any disclaimer, the term of this patent is extended or adjusted under 35 U.S.C. 154(b) by 280 days.

(21) Appl. No.: 15/489,845

(22) Filed: Apr. 18, 2017

(65) Prior Publication Data
US 2017/0300086 A1 Oct. 19, 2017

Related U.S. Application Data

(60) Provisional application No. 62/324,810, filed on Apr. 19, 2016, provisional application No. 62/441,872, filed on Jan. 3, 2017.

(51) Int. Cl.
*G06F 1/16* (2006.01)
*A45C 13/02* (2006.01)
(Continued)

(52) U.S. Cl.
CPC .............. *G06F 1/1628* (2013.01); *A45C 5/03* (2013.01); *A45C 13/02* (2013.01); *B65D 25/24* (2013.01); *B65D 81/05* (2013.01); *G06F 1/1603* (2013.01); *A45C 2005/037* (2013.01); *A45C 2013/025* (2013.01); *A45C 2200/15* (2013.01)

(58) Field of Classification Search
CPC ........... A45C 5/00; A45C 5/03; A45C 13/001; A45C 13/02; A45C 2005/037; A45C 2200/15; A45C 13/00; B65D 25/24; B65D 43/16; B65D 43/24; B65D 81/05; F16M 11/22; G06F 1/16; G06F 1/1603; G06F 1/1635; G06F 1/1637; G06F 1/1628;
(Continued)

(56) References Cited

U.S. PATENT DOCUMENTS 5,233,468 A * 8/1993 McNulty ............... G06F 1/1603
348/842
5,325,970 A * 7/1994 Dillon ................... G06F 1/1628
150/165
(Continued)

*Primary Examiner* — Bryon P Gehman
(74) *Attorney, Agent, or Firm* — Lewis B. Sternfels

(57) ABSTRACT

A spring-loaded or springy biased platform for support of the components carried with a case, such as to hold a portable computer or other device so that, when the case is closed, the computer or other device is securely held within the case. In addition, a foldable shade comprising foldable segments is placeable fully within the case lid and deployable when the case is opened with end portions of the segments extending into a bottom of a bottom shell so as to enable shading of the computer screen from light ambient to the computer when the portable computer is secured to said platform. A novel connection between the case and a light stand is provided, including an improved set screw attachment. Furthermore, the computer is secured to the top surface of the spring-loaded or springy biased platform by hook-and-loop fasteners (e.g., Velcro® fasteners), the platform has openings in it to provide ventilation. Brackets in the bottom surface of the platform enable a battery to be inserted within the brackets and to the platform. Included also within and attached to the bottom of the case are such components as a power supply and an external hard drive and associated wiring.

20 Claims, 19 Drawing Sheets

(51) Int. Cl.
*B65D 25/24* (2006.01)
*B65D 81/05* (2006.01)
*A45C 5/03* (2006.01)

(58) Field of Classification Search
CPC .... G02B 27/00; G02B 27/0018; G02B 27/04; H04B 5/64
USPC ............... 206/320, 774; 361/679.01, 679.02, 361/679.55–679.59, 683, 687, 688, 690; 359/601
See application file for complete search history.

(56) References Cited

U.S. PATENT DOCUMENTS

| | | | | |
|---|---|---|---|---|
| 5,379,893 | A * | 1/1995 | Ruiz | G06F 1/1628 190/900 |
| 5,988,823 | A * | 11/1999 | Wong | G06F 1/1603 348/842 |
| 6,173,835 | B1 * | 1/2001 | Swinger | A45F 3/02 190/102 |
| 6,181,554 | B1 * | 1/2001 | Cipolla | G06F 1/1616 361/679.02 |
| 6,229,698 | B1 * | 5/2001 | Harvey | G06F 1/1628 206/320 |
| 7,264,116 | B2 * | 9/2007 | Prentza | A45C 3/02 206/320 |
| 7,303,077 | B2 * | 12/2007 | Harlocker | G06F 1/1628 206/320 |
| 7,304,839 | B1 * | 12/2007 | Burns | G06F 1/1601 108/38 |
| 7,819,247 | B2 * | 10/2010 | Gonzalez | A47B 23/04 190/11 |
| 8,172,077 | B1 * | 5/2012 | Gray | B25H 1/04 190/107 |
| 8,199,490 | B2 * | 6/2012 | Wilkenfeld | F16M 13/00 361/679.02 |
| 8,752,912 | B1 * | 6/2014 | Johns | A47B 13/023 312/241 |
| 9,310,615 | B2 * | 4/2016 | Allen | G02B 27/04 |
| 9,913,697 | B1 * | 3/2018 | DeVeaux | A61B 50/30 |
| 2010/0195279 | A1 * | 8/2010 | Michael | G06F 1/1632 361/679.41 |
| 2011/0011759 | A1 * | 1/2011 | Luo | A45C 5/03 206/320 |

* cited by examiner

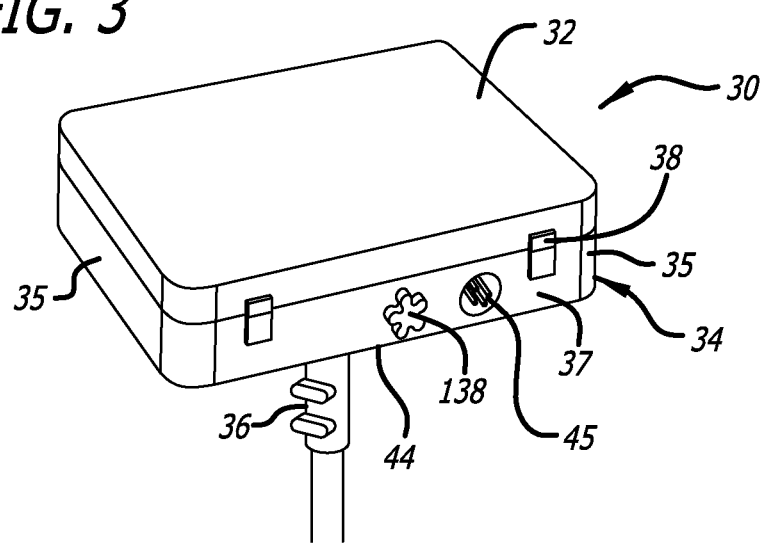
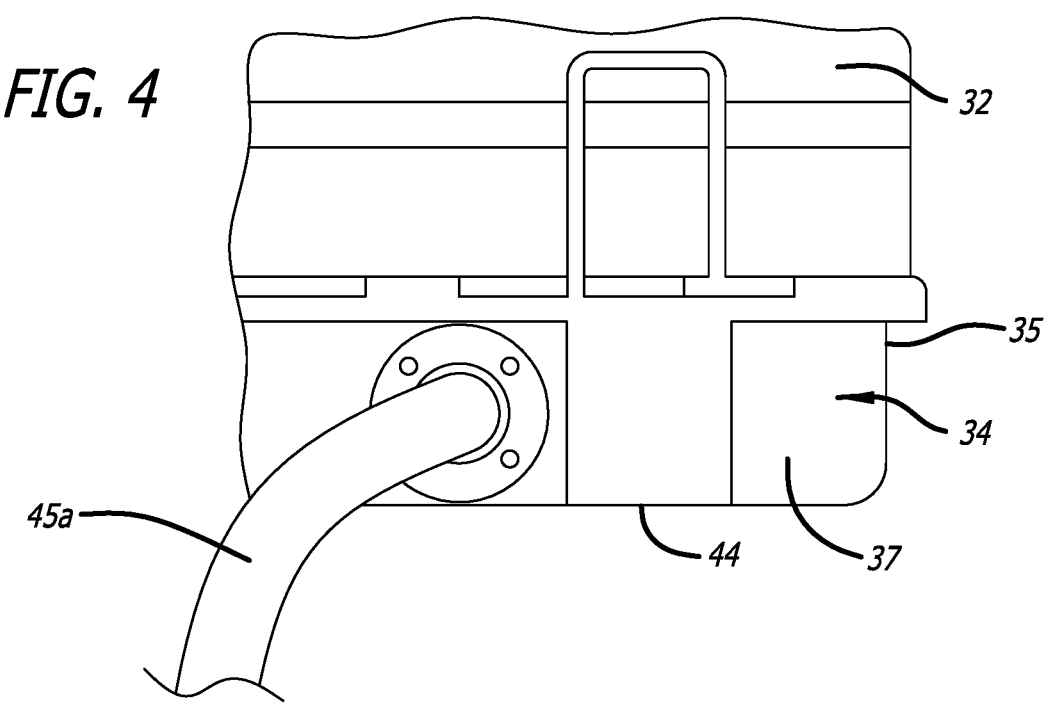

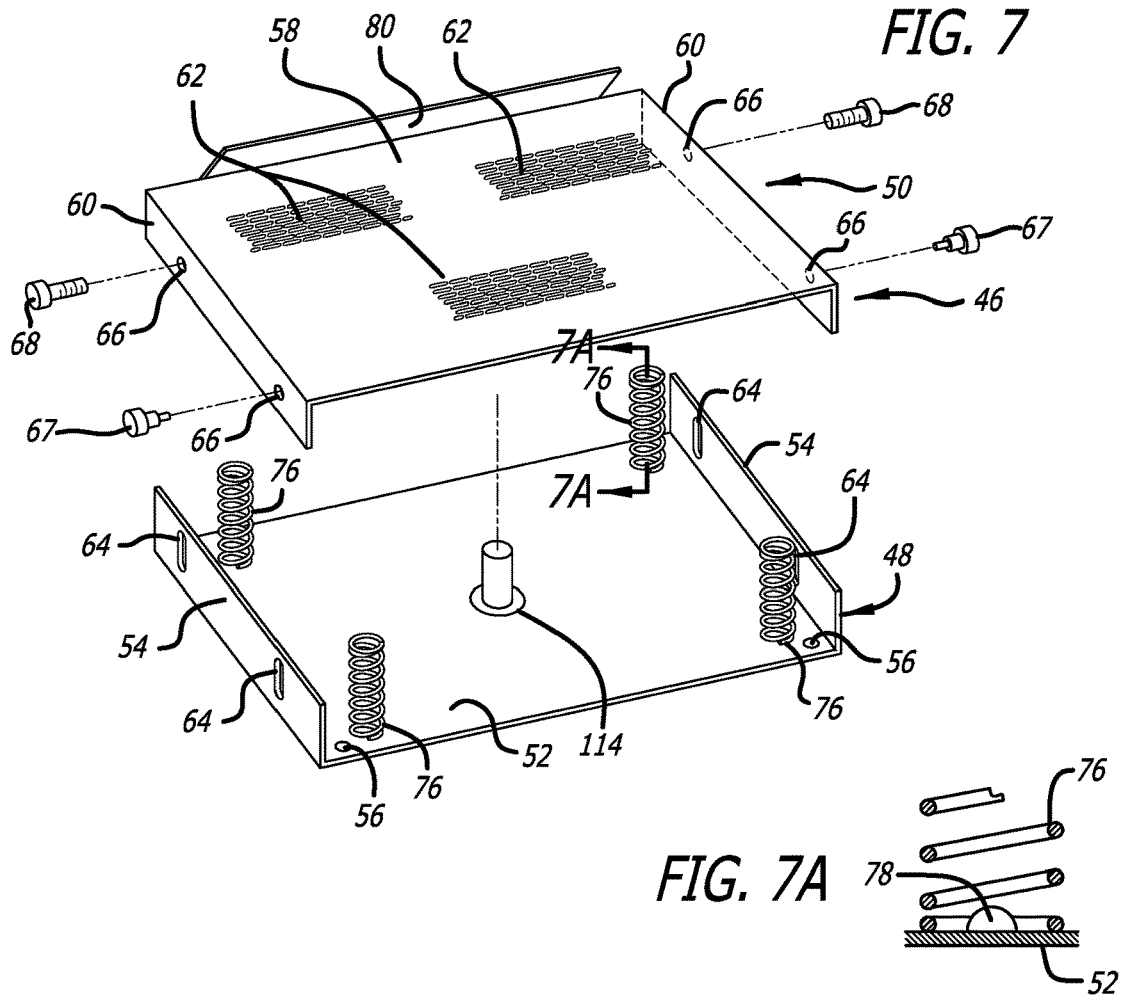
FIG. 7
FIG. 7A
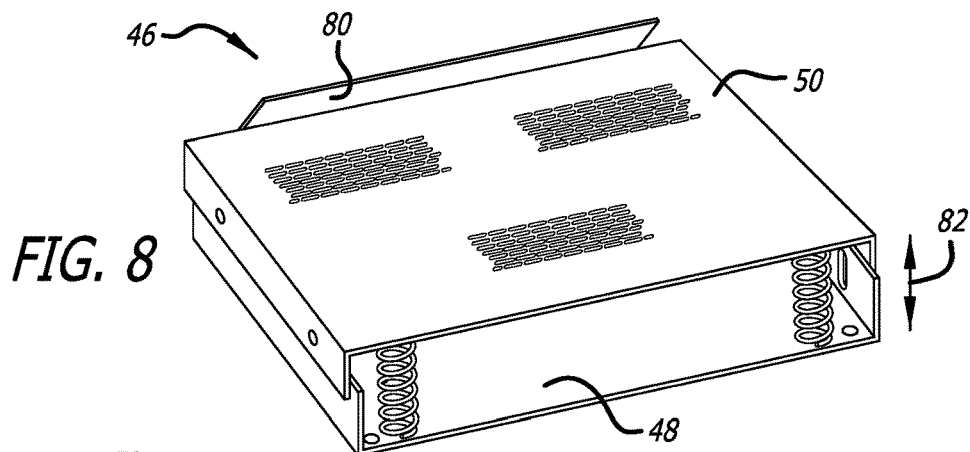
FIG. 8
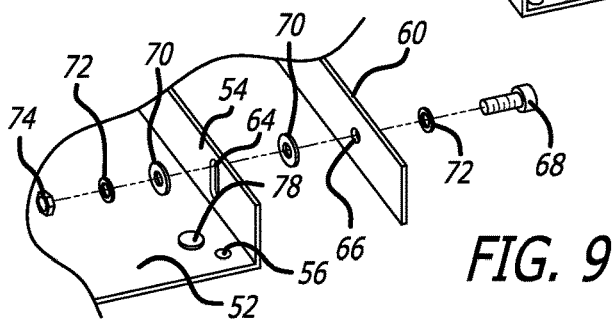
FIG. 9

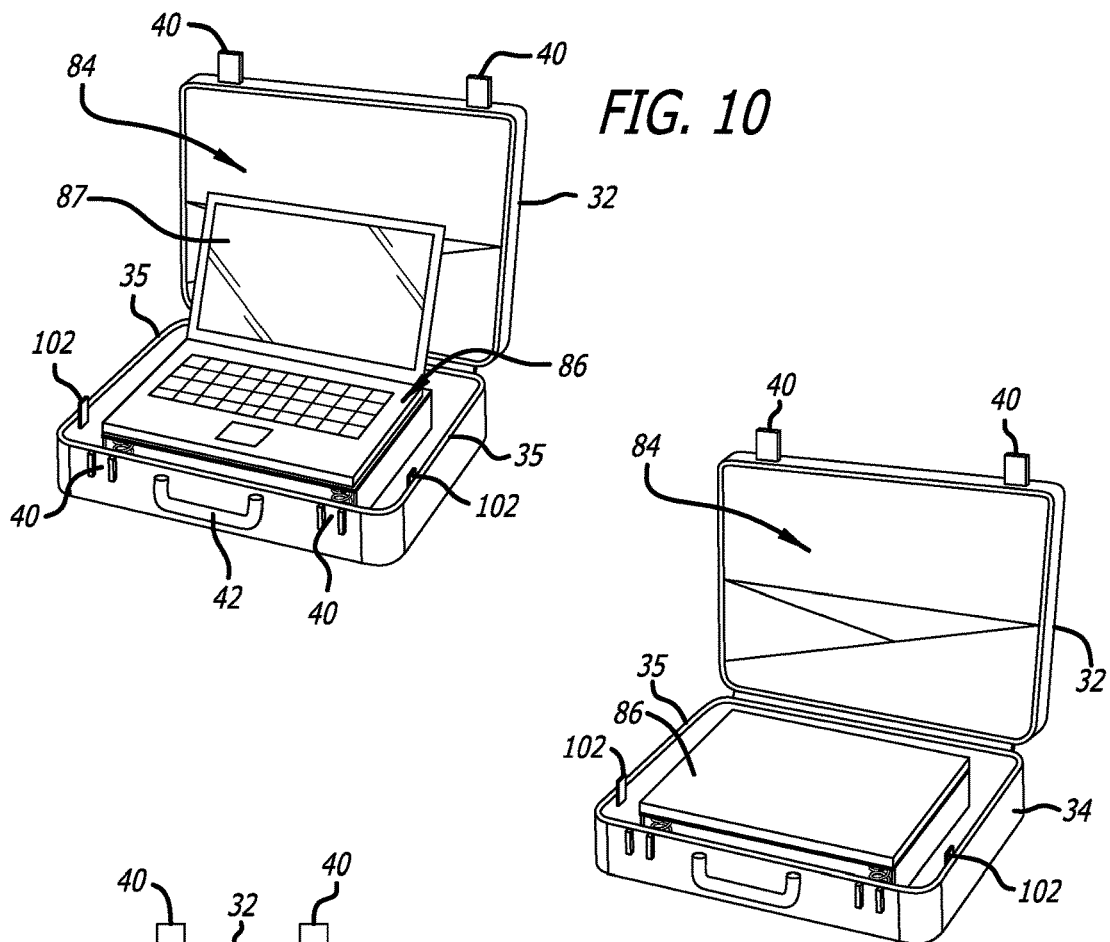
FIG. 10
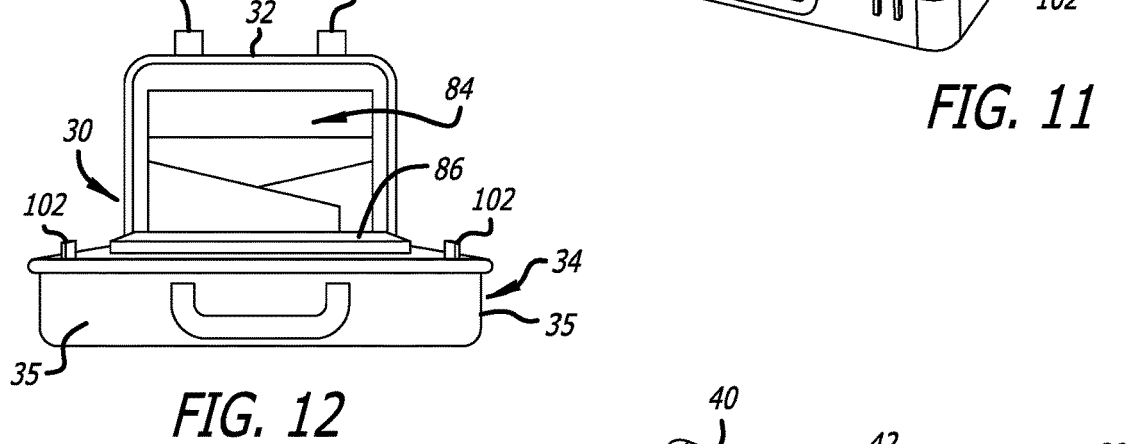
FIG. 11
FIG. 12
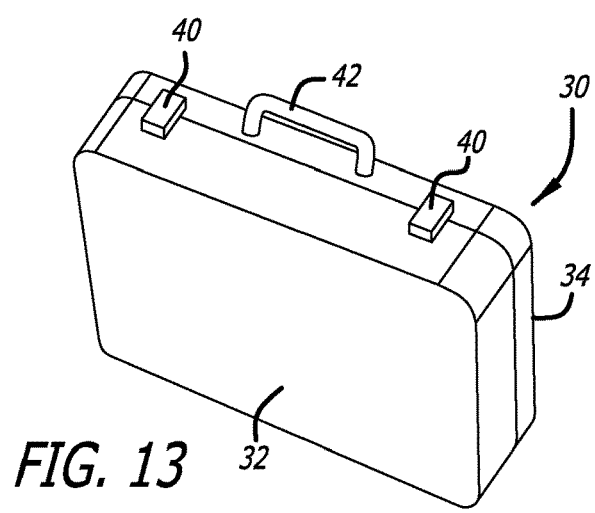
FIG. 13

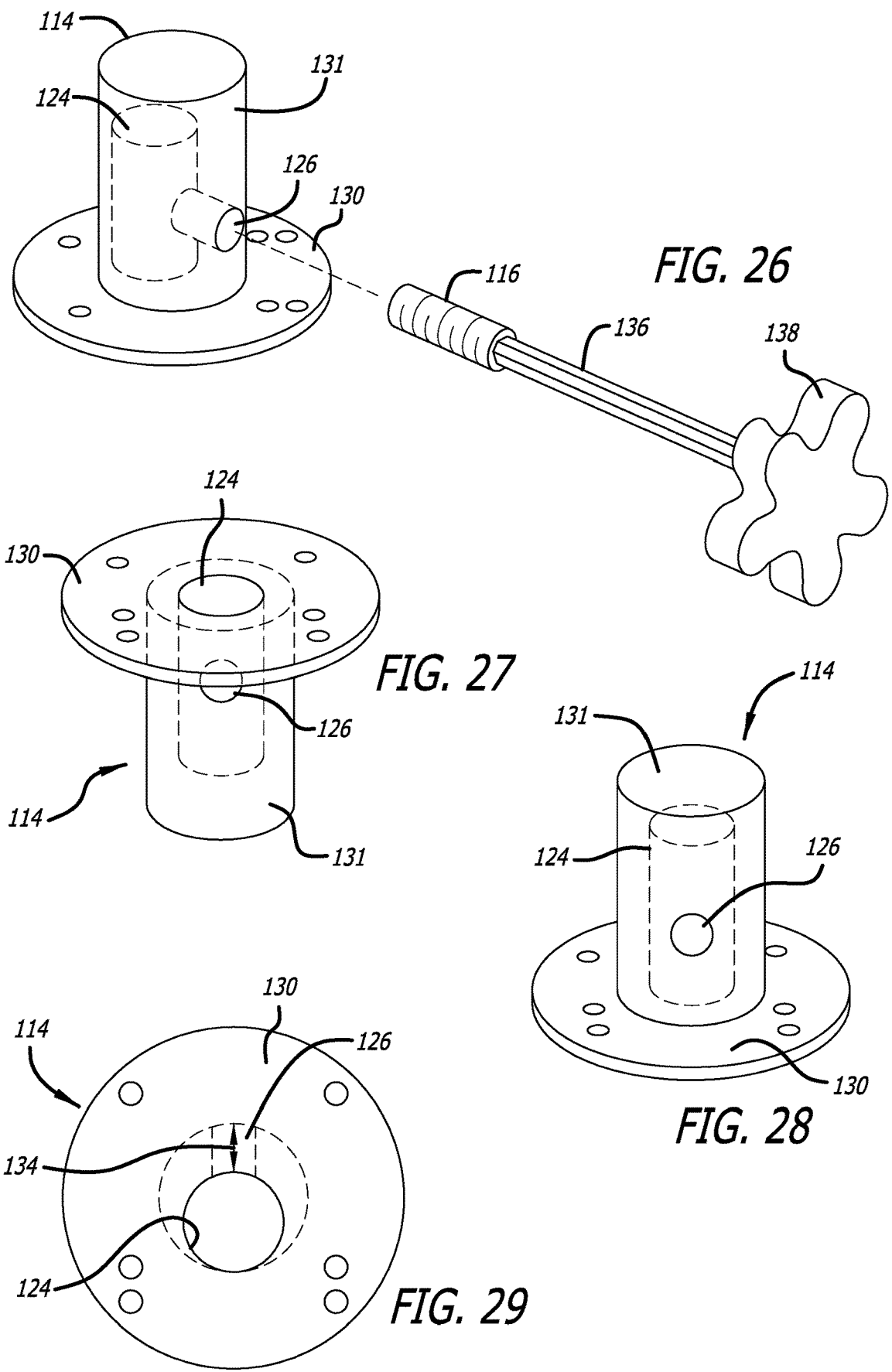

COMPUTER CASE, PLATFORM, FOLD-OUT SHADE AND LOCK SET SCREW

CROSS-REFERENCE TO RELATED APPLICATION

This application claims the benefit of U.S. Provisional Application No. 62/324,810 filed 19 Apr. 2016 and U.S. Provisional Application No. 62/441,892 filed 3 Jan. 2017.

REFERENCE REGARDING FEDERAL SPONSORSHIP

Not Applicable

REFERENCE TO MICROFICHE APPENDIX

Not Applicable

FIELD OF THE INVENTION

The present invention relates to a computer case platform, fold-out shade and lock set screw which is particularly suited for enclosing, transporting, deploying and using a portable computer, e.g., a laptop computer.

DESCRIPTION OF RELATED ART AND OTHER CONSIDERATIONS

There has been found a need for improved portability of camera, computers and the like for better protection of them from damage, such as amelioration from shock, and for enclosing, transporting, deploying and using a portable computer, including their being set up on a stand, and for shading them from ambient light. In particular, while there exist varied computer suitcases, not all have provided a betterment of such protection, enclosure, transport, deployment and use.

SUMMARY OF THE INVENTION

These and other problems are successfully addressed and overcome by the present invention by providing a spring-loaded or springy biased platform for support of the components carried with a case, such as a computer case or suitcase so that, when the case is closed, the computer or other component is securely held within the case. The spring-loaded or springy biased platform ameliorates shocks onto the computer. In addition, a foldable shade is placeable with the case lid and deployable when the case is opened. The foldable shade includes a terminal segment comprising a drop-down daylight visor with an interior opening for enabling one to have a better view of the computer screen when the surrounding ambient light, such as daylight, might otherwise prevent an adequate view of the computer screen. A novel connection between the case and a light stand is provided, including an improved set screw attachment. Furthermore, the computer is secured to the top surface of the spring-loaded or like biased platform by hook-and-loop fasteners (e.g., Velcro® fasteners), the platform has openings in it to provide ventilation. Brackets in the bottom surface of the platform enable a battery to be inserted within the brackets and to the platform. Included also within and attached to the bottom of the case are such components as a power supply and an external hard drive and associated wiring.

BRIEF DESCRIPTION OF THE DRAWINGS

FIG. 3 is an isometric view of an embodiment of the present invention comprising a computer case, with its lid closed upon its bottom shell, as supported on a light stand taken from its backside;

FIG. 4 is an expanded partial view of the computer case shown in FIG. 3 added with a power cord extending therefrom;

FIG. 7 depicts an isometric and exploded view of the interior components of the computer case as previously illustrated showing a platform, as linearly movable with respect to a base which is coupled to the computer case bottom, and biasing springs which are adapted to support and securely hold a laptop computer within its base when the computer lid is closed upon its bottom, a portion of one such biasing spring being illustrated in FIG. 7A as taken along line 7A-7a of FIG. 7;

FIG. 8 shows an isometric exploded view of the interior components of the computer case as illustrated in FIG. 7, showing the mechanisms now coupled and pressed together when the case lid is closed upon and latched to its bottom for securely supporting a laptop computer;

FIG. 9 is an exploded three-dimensional view illustrating the mechanical parts permitting linear movement of the platform with respect to its base;

FIG. 10 is an isometric view of the previously shown computer case (a) opened with a laptop computer placed within it and upon the linearly movable platform and with its computer lid open and (b) with a foldable shade positioned behind the open laptop lid;

FIG. 11 is an isometric view of the assemblage illustrated in FIG. 10 but with the computer lid closed upon the laptop, thus fully illustrating the folded shade;

FIG. 12 is a frontal view of the assemblage depicted in FIG. 11;

FIG. 13 is an isometric view of the computer case as closed so as to press the computer as positioned upon its platform compressing the platform upon its base and thus securing the laptop within the case;

FIG. 26 is an isometric view of the stand adapter coupled to the bottom of computer case bottom by means of a locking screw and the tool employed to rotate the screw;

FIGS. 27 and 28 are isometric views of the stand adapter shown in FIG. 26 taken from it top and its bottom, with FIG. 26 depicting the offset of a threaded hole in the stand adapter;

FIG. 29 is a top view of the stand adapter illustrated in FIGS. 27 and 28;

DETAILED DESCRIPTION

Figure 1:
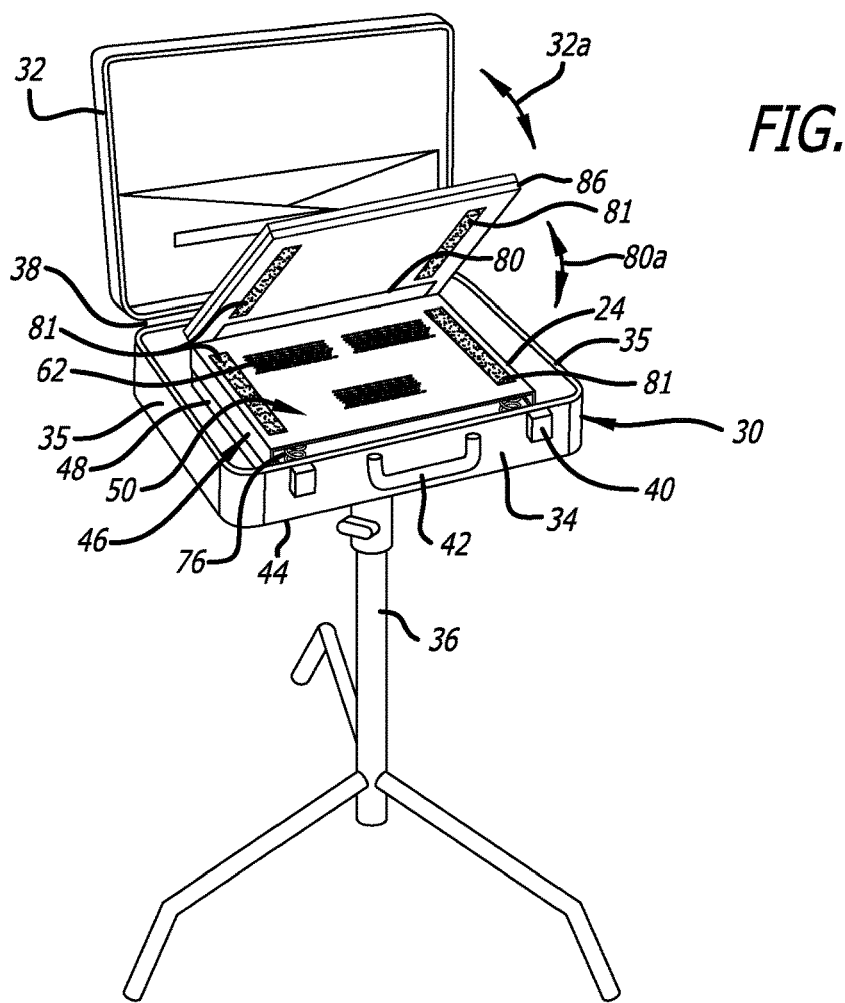
FIG. 1 is an isometric view of a preferred embodiment of the present invention comprising a computer case secured to a light stand with interior elements including a computer support including a platform, a laptop computer swivably hinged to the platform and a fold-out shade.
Figure 2:
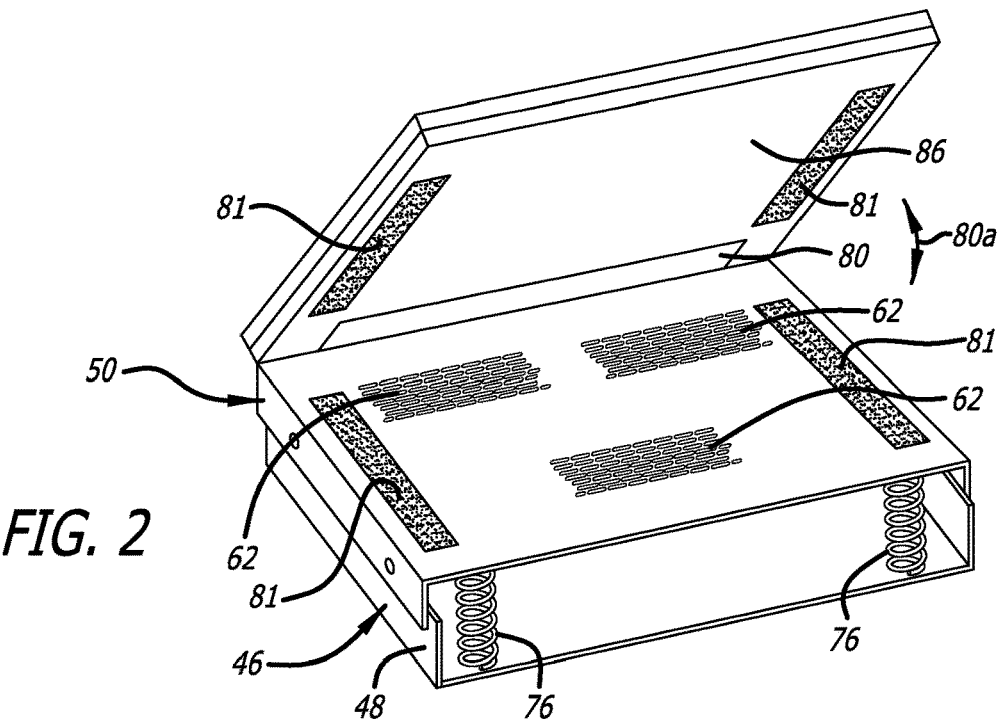
FIG. 2 is an isometric view of a portion of the embodiment depicted in FIG. 1 including the laptop computer swivably hinged to the platform and spring-loaded thereon.
Figure 5:
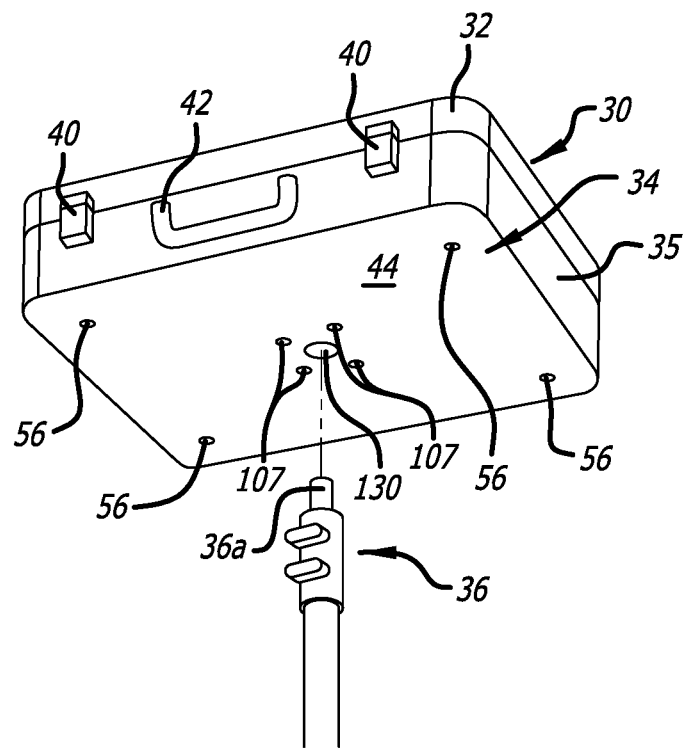
FIG. 5 is an isometric view of the embodiment illustrated in FIG. 3 depicting the computer case as supported on the light stand taken from its front side and viewed from its underside but with the light stand slightly distanced from its coupling with the bottom of the computer case.
Figure 6:
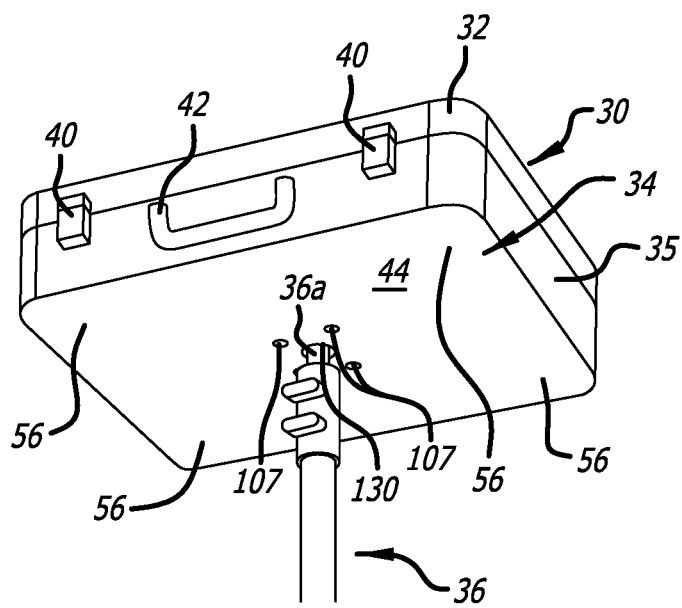
FIG. 6 is an isometric view of the embodiment illustrated in FIGS. 3 and 5 and similarly taken as that shown in FIG. 5 but with the light stand coupled to the bottom of the computer case.
Figure 14:
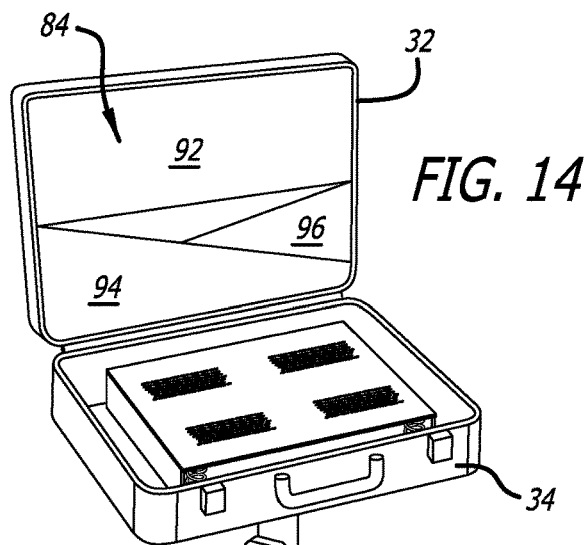
FIGS. 14-21 isometrically illustrate the deployment of the shade from being folded within the case lid to being fully deployed onto the case shell and about the computer, thus enabling shading of the laptop computer when used.
Figure 15:
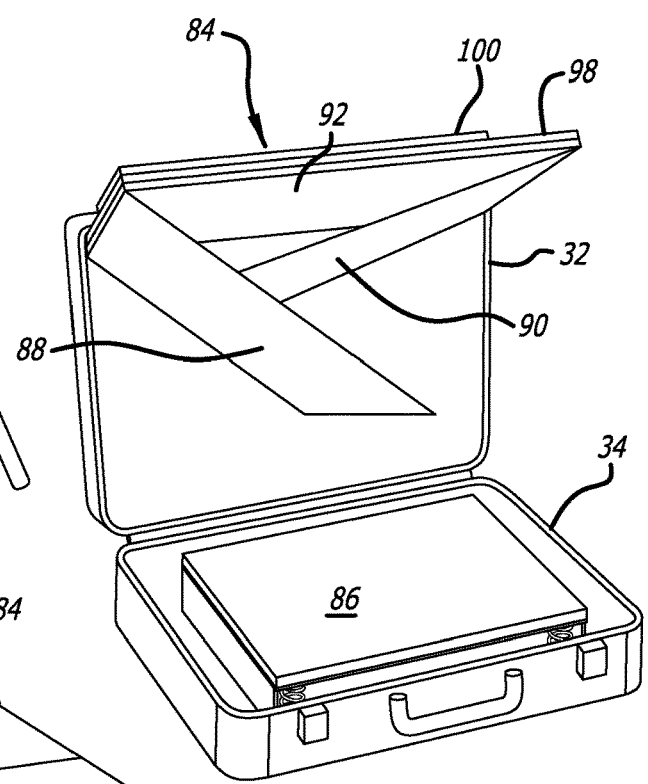
Figure 19:
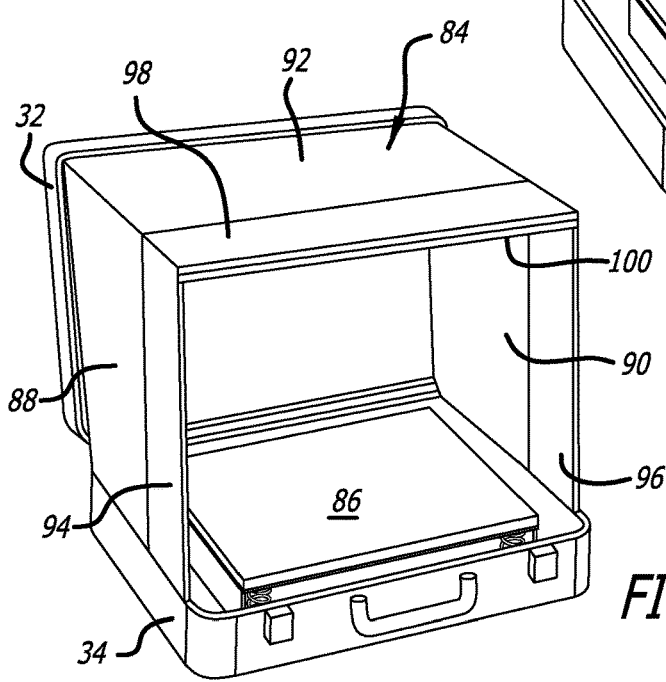
Figure 16:
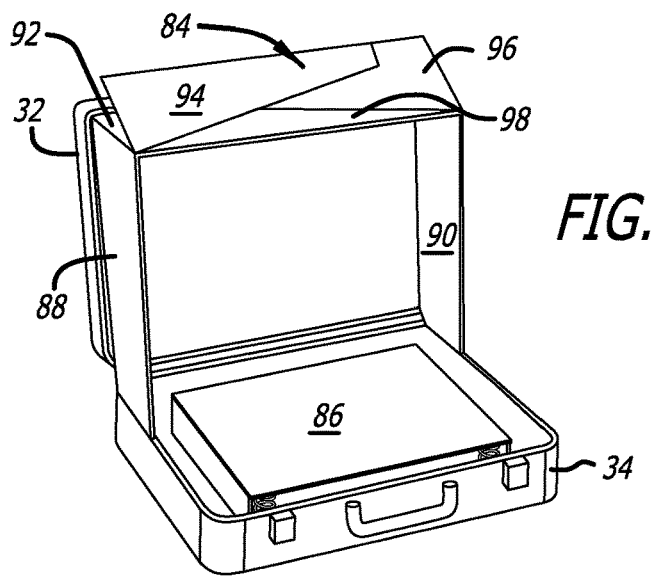
Figure 17:
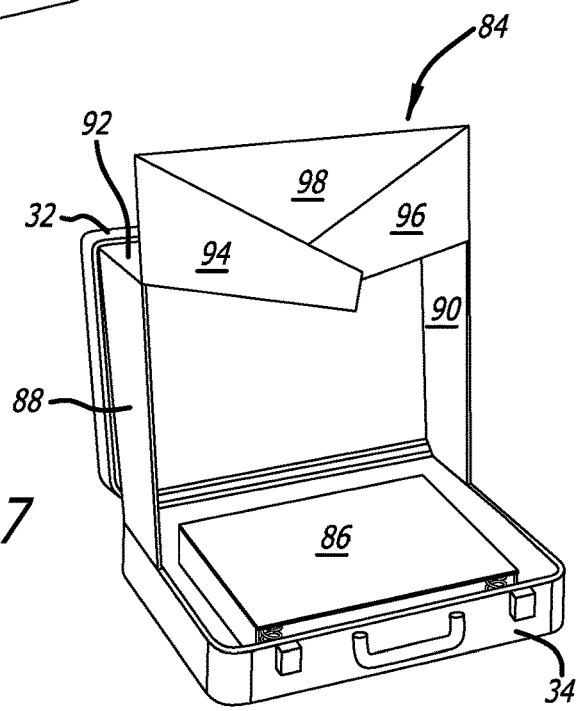
Figure 18:
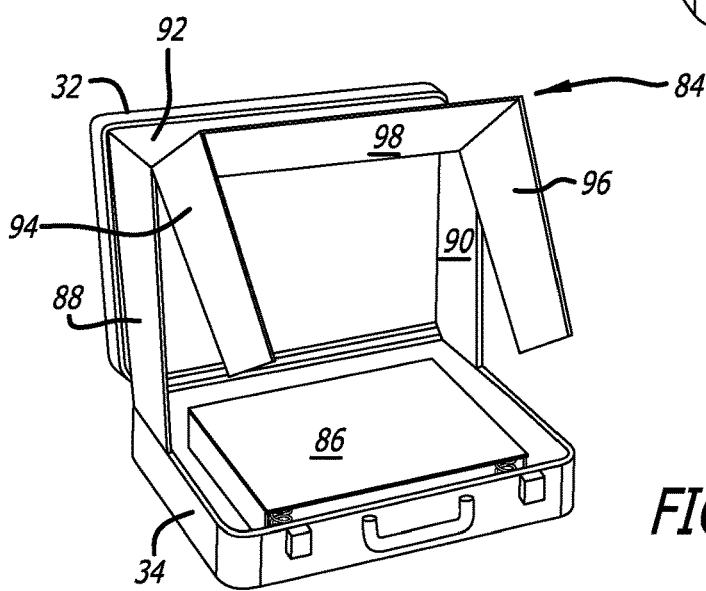
Figure 20:
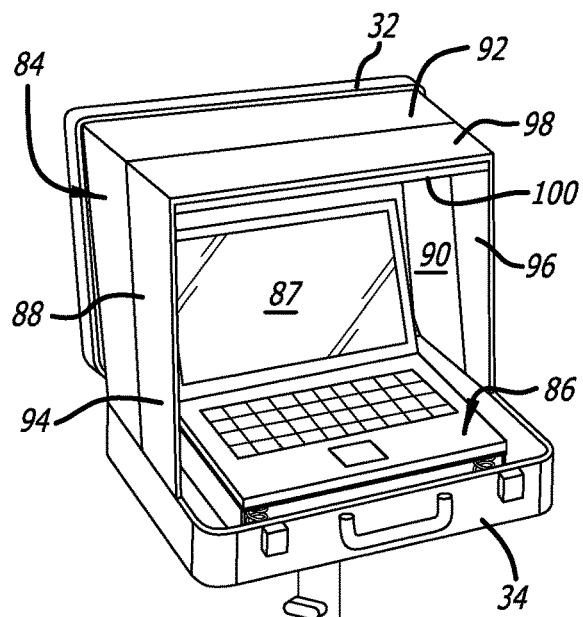

Accordingly, FIGS. 1-6 illustrate a preferred embodiment of the present invention comprising a computer case 30 for housing a computer 86, herein shown as a laptop computer. Case 30 includes a lid 32 and a bottom shell 34. The case is supported on a light stand 36. Lid 32 is conventionally hinged to the bottom shell by hinges 38 for movement therewith as illustrated by double-headed arrow line 32a and latches 40. A handle 42 completes the basic parts of computer case 30. Bottom shell 34 includes sides 35, a backside 37 and a bottom 44 which is adapted to be secured to the light stand by a securing mechanism as later described in association with FIGS. 22-33. In addition to other embodiments of the present invention as described and shown in FIGS. 6-33, electrical connection of the computer within case 30 is accomplished by means of a power inlet 45 (FIG. 3) in backside 37, e.g., by use of an outlet splitter for enabling a power cord 45a to extend therefrom as illustrated in FIG. 4.

Figure 22:
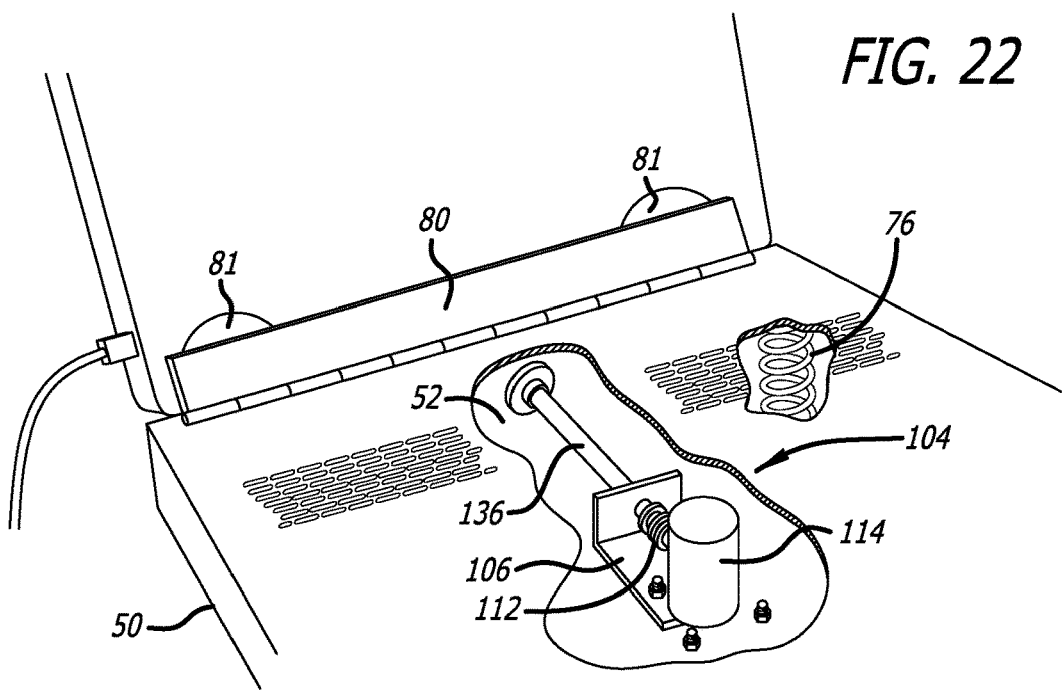
FIGS. 22-24 are isometric views of the mechanisms for enabling the computer case to be secured to the light stand as detailing the coupling and support of the computer case upon the light stand from that as depicted in FIGS. 1-6.
Figure 23:
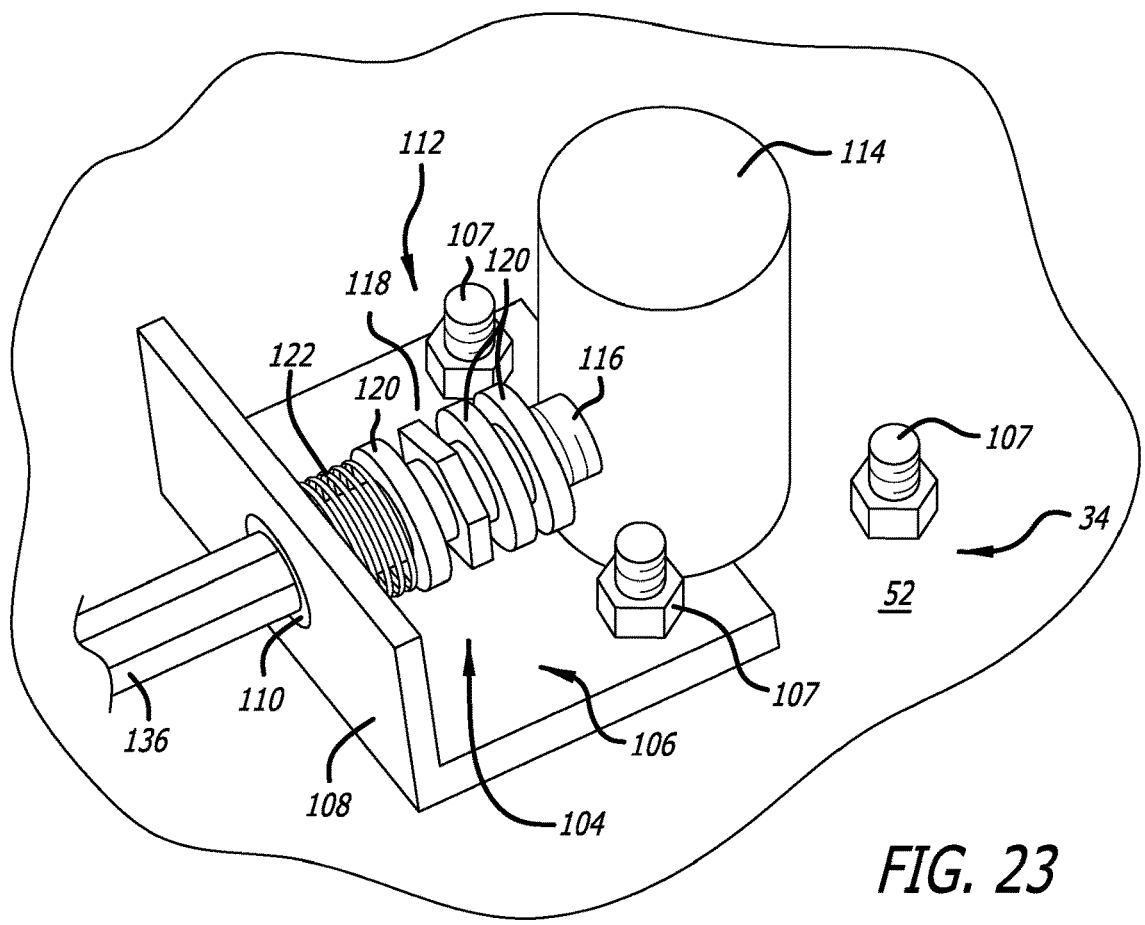

Reference is now made to FIGS. 7-9 which detail a computer support 46 contained within the interior of computer case 30. Support 46 includes a base 48 and a platform 50 which is linearly movable therewith. Openings 62 are formed in platform 50 which form an access to any devices existing beneath the platform as well as ventilation for the heat developed by the computer. Base 48 includes a flat baseplate 52 and flat side plates 54 upstanding therefrom. Flat baseplate 52 is secured to bottom 44 of bottom shell 34 by screws or bolts and nuts 56 (shown in FIGS. 22 and 25 and symbolically shown as circles in FIGS. 5 and 6) or the equivalent so as to immobilize platform base 48 with respect to bottom 44 of shell 34. Platform 50 includes a flat surface 58, which is disposed to support laptop computer 86, and downwardly extending side plates 60. As shown in FIG. 22, securement of the computer may be effected by hook-and-loop fasteners 81 (e.g., Velcro® fasteners) on the computer and the platform between pads on hinge 80 and similar mating fasteners on the computer bottom.

The linear movement of platform 50 with respect to base 48 is effected by a coupling that includes slots 64 or elongated apertures formed in upstanding side plates 54 and circular holes or openings 66 in downwardly extending side plates 60. As best shown in FIG. 9, side plates 54 and 60 are joined together by a combination of quick-release pins 67 and shoulder bolts 68 extending through holes 66 and slots 64, Polytetrafluoroethylene (PTFE) (Teflon® PTFE) and other washers 70 and 72, and nuts 74. Quick-release pins 67 are appropriately placed between side plates 54 and 60. Bolts 68 operate as pivots at a first connection between the platform and base 48 while quick-release pins 67 form a coupling or link that acts as a second connection to base 48. The second connection enables a separation of the platform from the base so as to enable pivoting of the platform with respect to the base about the pivot (bolts 68) and to permit access to all components underlying the platform.

Computer support 46 further includes biasing springs 76 which are positioned between flat baseplate 52 of base 48 and flat surface 58 of platform 50. Raised domed circles 78 (one of which is shown in FIG. 7a) are incorporated onto baseplate 52 and, if needed, onto both of the facing surfaces of baseplate 52 and flat surface 58 for holding springs 76 in place. Hinge 80 on the rear of platform 50 is coupled to computer 86 (e.g., see FIGS. 1 and 2) so that the computer may be swivelled up as illustrated by double-headed arrow line 80a in FIGS. 1 and 2 to permit access to devices contained in the lower case so that, as suggested in the comparison between FIGS. 7 and 8, when the lid is closed upon bottom shell 34 and onto the top of the laptop computer, the laptop computer forces platform 50 downwardly against the bias of springs 76 as depicted by double-headed arrow line 32a to support and securely hold the laptop computer within computer case. Such compression also occurs when shades (see FIGS. 10-21) are built into the case lid.

Figure 21:
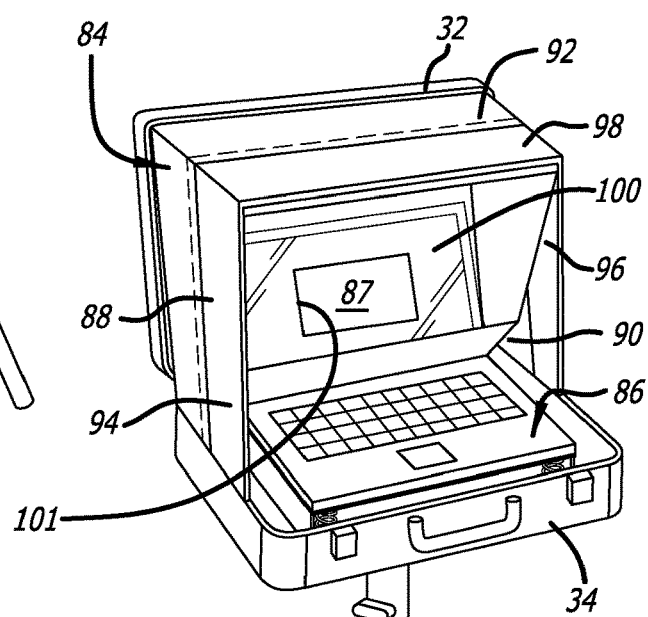

Reference is now made to FIGS.10-21 and the description relating thereto of a fold-out shade assembly 84. Included within these figures is laptop computer 86, referred to in prior figures, having a laptop screen 87. Fold-out shade assembly 84 is formed of a plurality of segments 88, 90, 92, 94, 96, 98 and 100. The segments preferably are formed from a single sheet of plastic or comparable material with creases, acting as hinges, placed between adjacent segments to enable the assembly to the folded into lid 32 and deployed into its shaded condition, specifically to shade the computer screen (see FIGS. 20 and 21) and anything else within the case from ambient light. A pair of brackets or slots 102 (e.g., FIGS. 10-12) are built in into bottom shell 34 of computer case 30 at its sides 35 for enabling respective shade segments 88 to be latched or fitted into its respective bracket or slot 102 as depicted in FIGS. 15-21. Unfolding of shade assembly 84 is accomplished by the respective unfolding of each segment or pairs thereof in seriatim as best depicted in FIGS. 14-21. As shown in FIG. 21, segment 100 is a drop-down daylight visor with an interior opening 101 for enabling a viewer to have a better view of computer screen 87 when the surrounding ambient light, such as daylight, might otherwise prevent an adequate view of the computer screen. The plurality of segments include a first triplicate section (segments 88, 90 and 92) coupled to the inside surface of the lid, a second triplicate section (segments 94, 96 and 98) secured to the first triplicate section and an end segment (segment 100) comprising a drop-down daylight visor extendable in front of the screen of the portable computer wherein said lid comprises a base with sides extending from said base and towards said case shell, said sides of said base of said lid having dimensions such as to house said shade assembly fully into said lid and within said sides. In addition, the second triplicate section terminates in an end generally at an open portion of the shell, and the drop-down daylight visor with the interior opening is set back from the end of the second triplicate section so that the drop-down daylight visor is within in and thereby shaded by the second triplicate section from light extraneous thereto, including direct sunlight. Thus, the visor window is set lower and closed to the computer screen when viewing to enable the viewer to better look at the screen.

Figure 24:
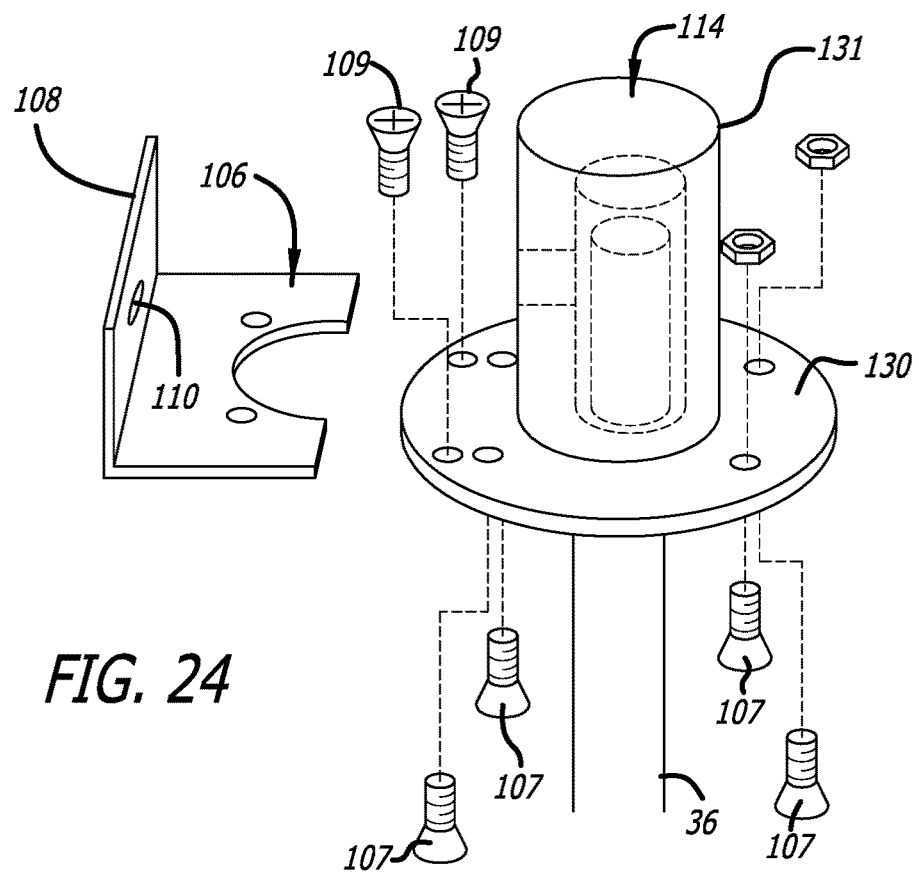
Figure 25:
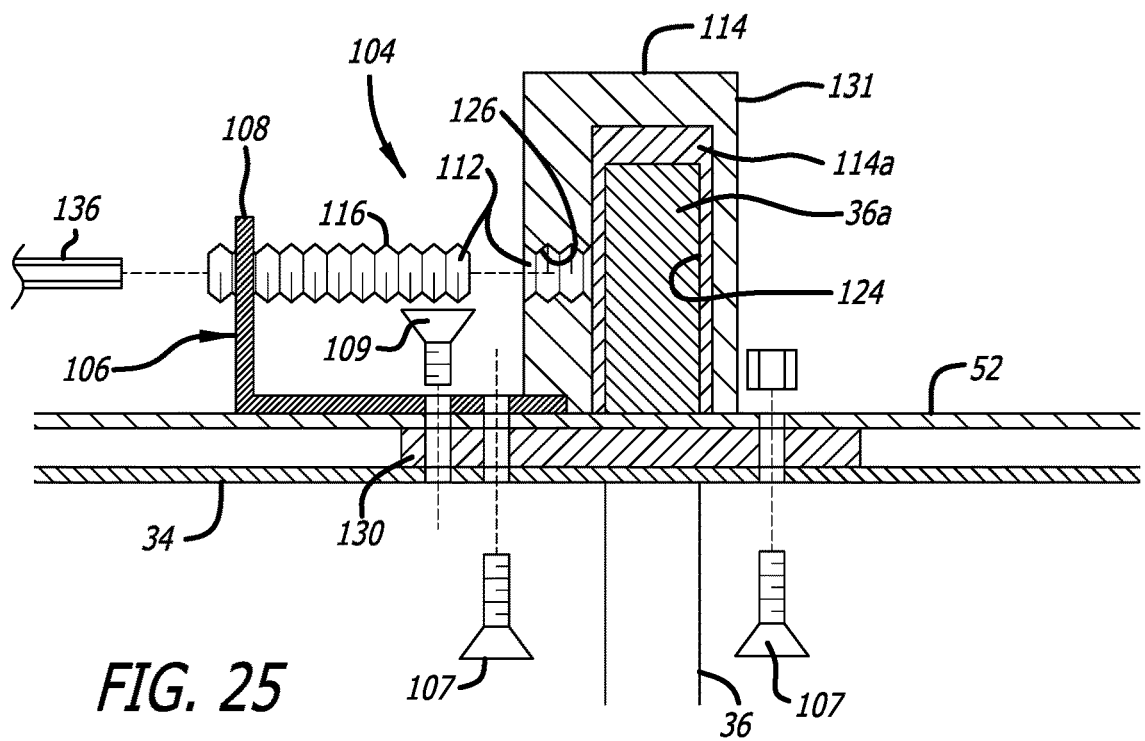
FIG. 25 is a cross-sectional view of the mechanisms illustrated in FIGS. 22-24.
Figure 30:
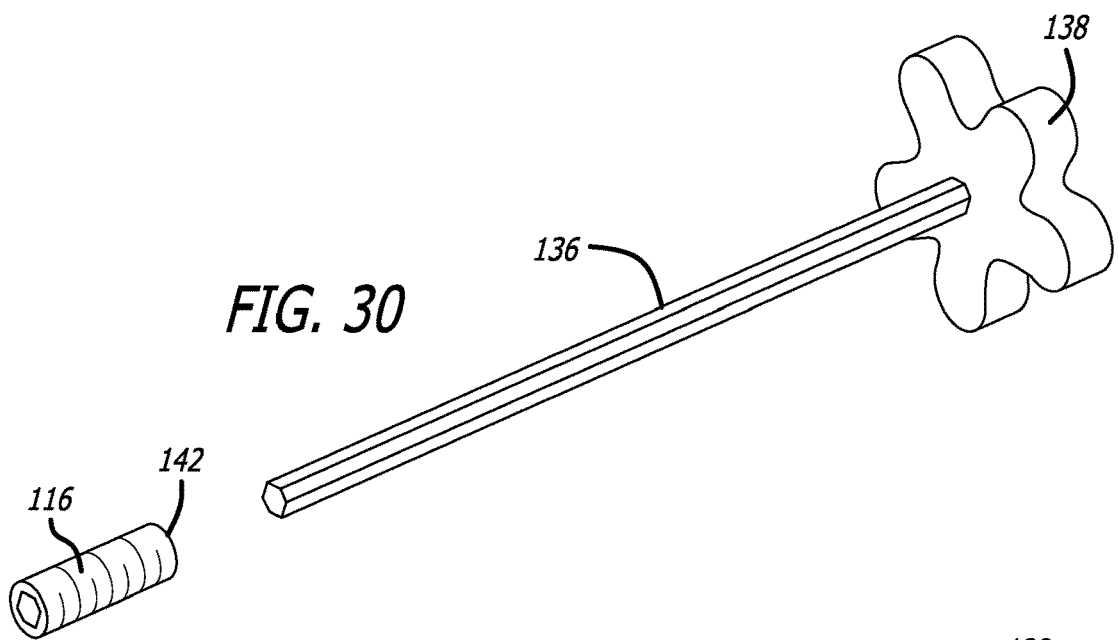
FIG. 30 is an isometric view of the screw and tool shown in FIG. 26 as separated from one another.
Figure 31:
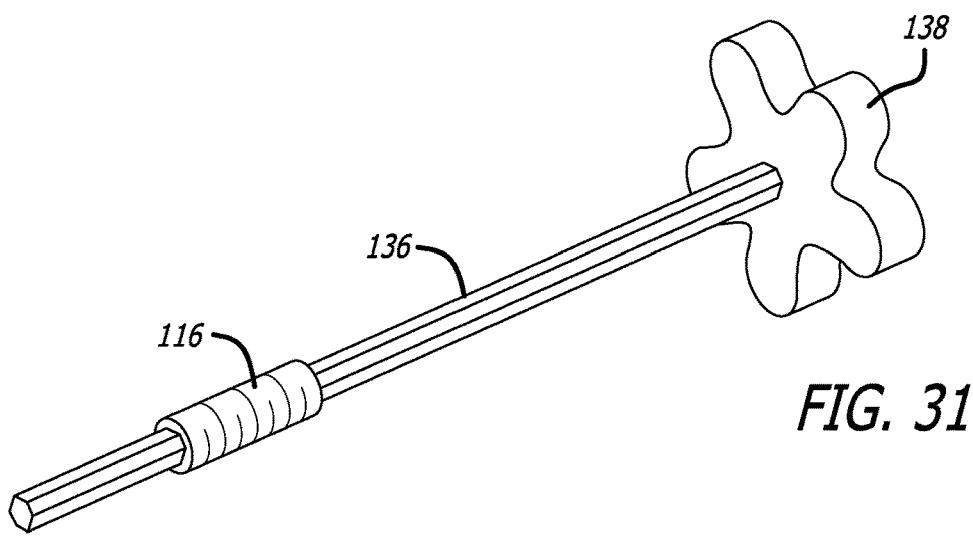
FIG. 31 is an isometric view of the screw and tool shown in FIG. 30 as engaged with one another.
Figure 32:
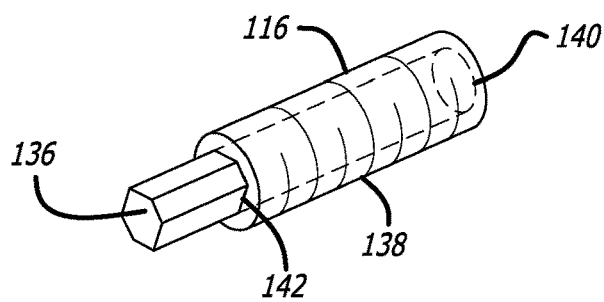
FIG. 32 is an isometric view of the screw itself.
Figure 33:
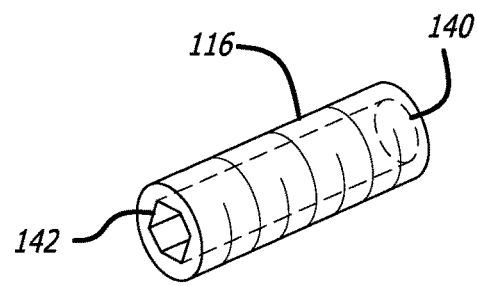
FIG. 33 is an isometric view of a coupling enabling the tool to engage the screw.
Figure 34:
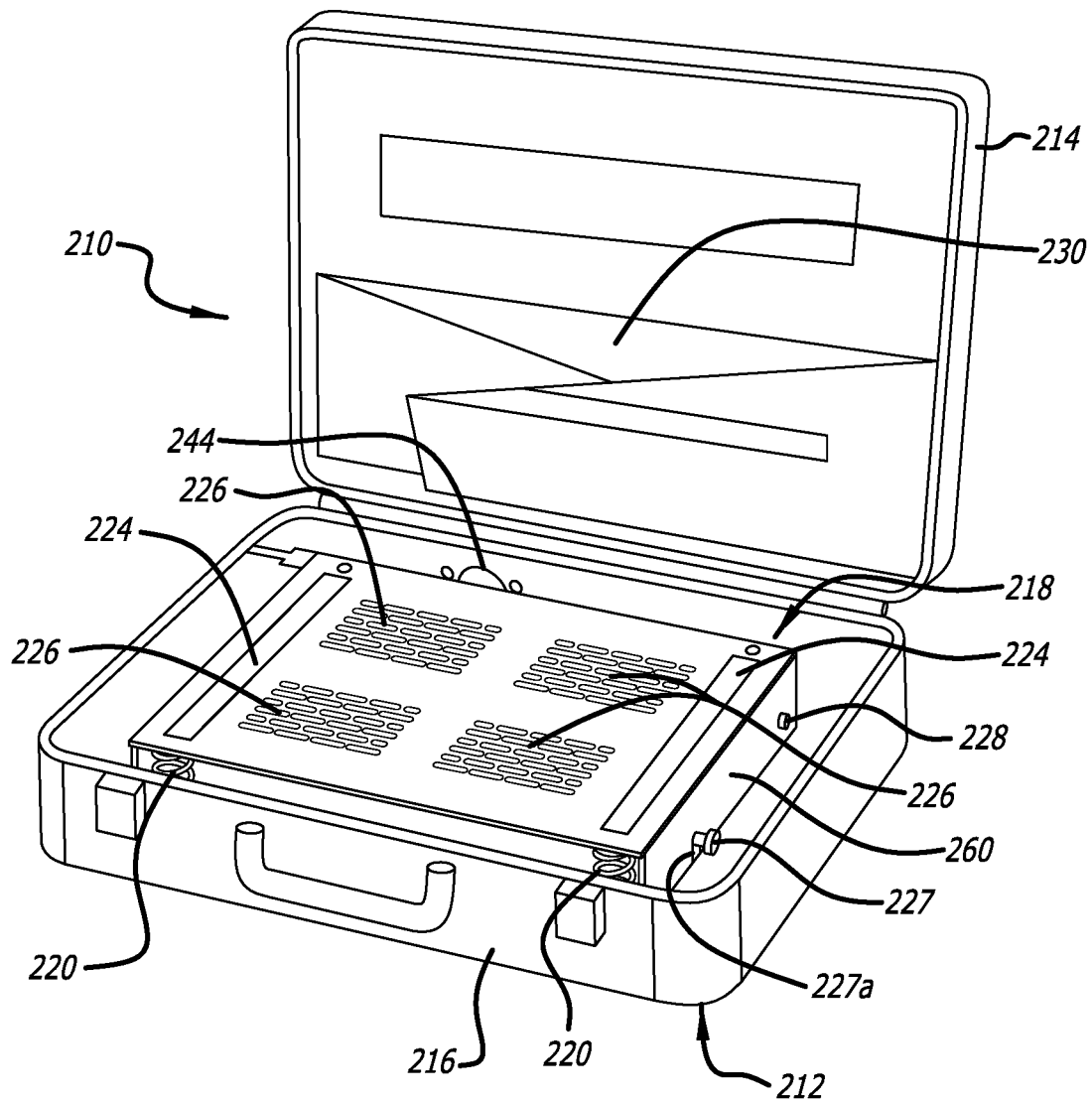
FIGS. 34-36 are isometric views of a computer case, similar to that previous depicted, with added platform features for enabling attachment of a computer thereto on its upper surface, for providing a differently configured ventilation for the computer, and for enabling attachment of a battery on its lower surface.
Figure 35:
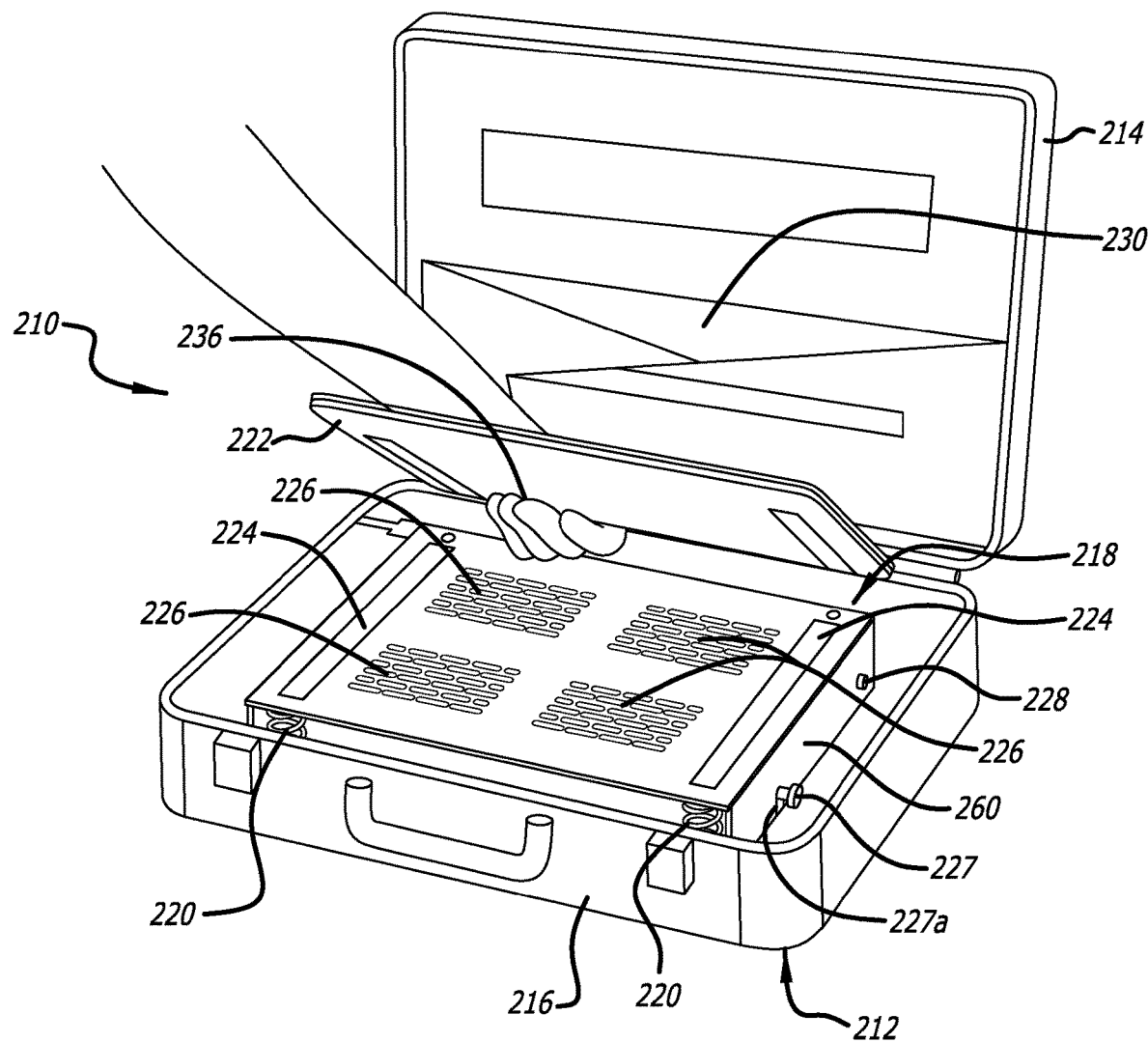
Figure 36:
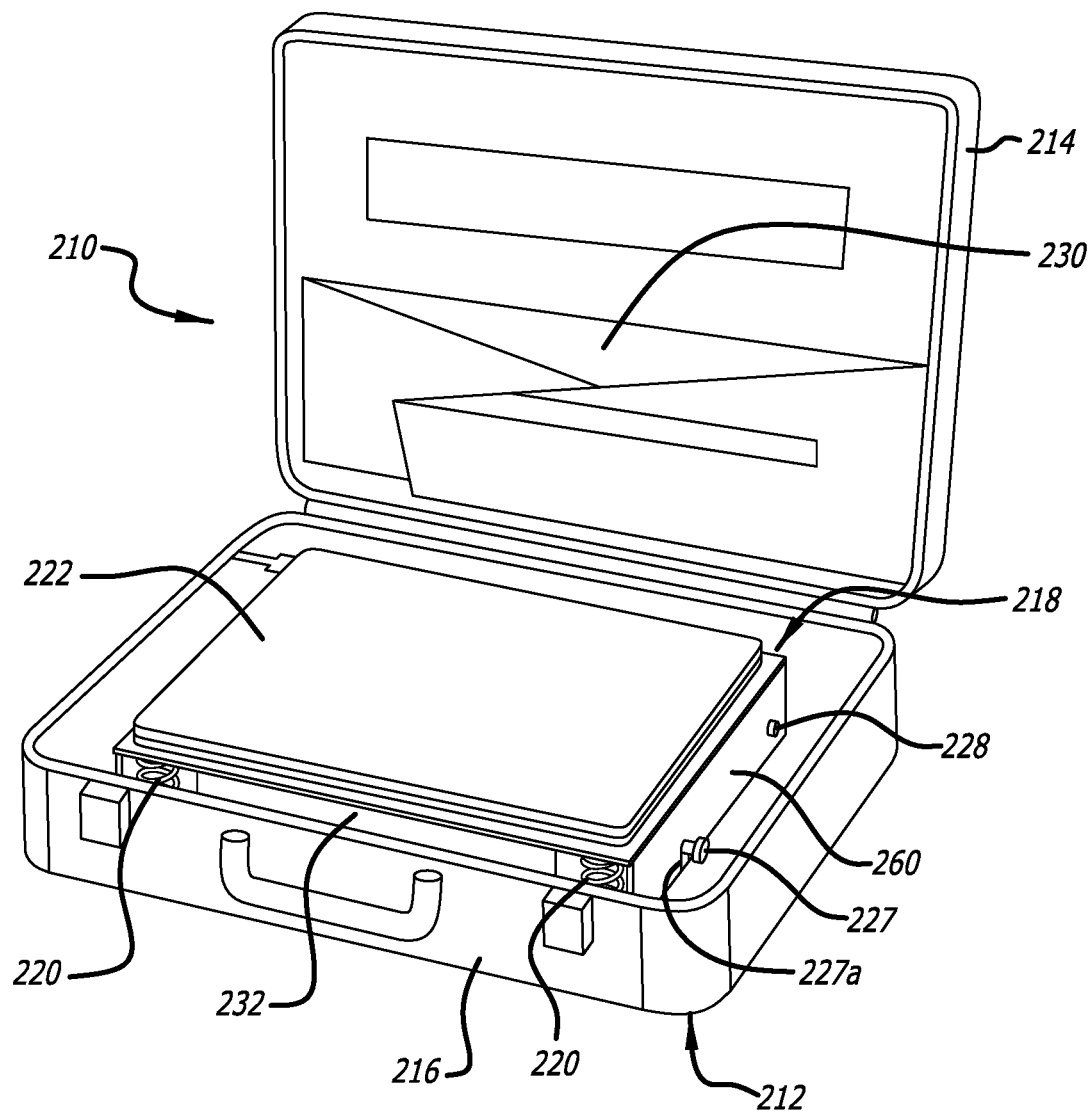
Figure 37:
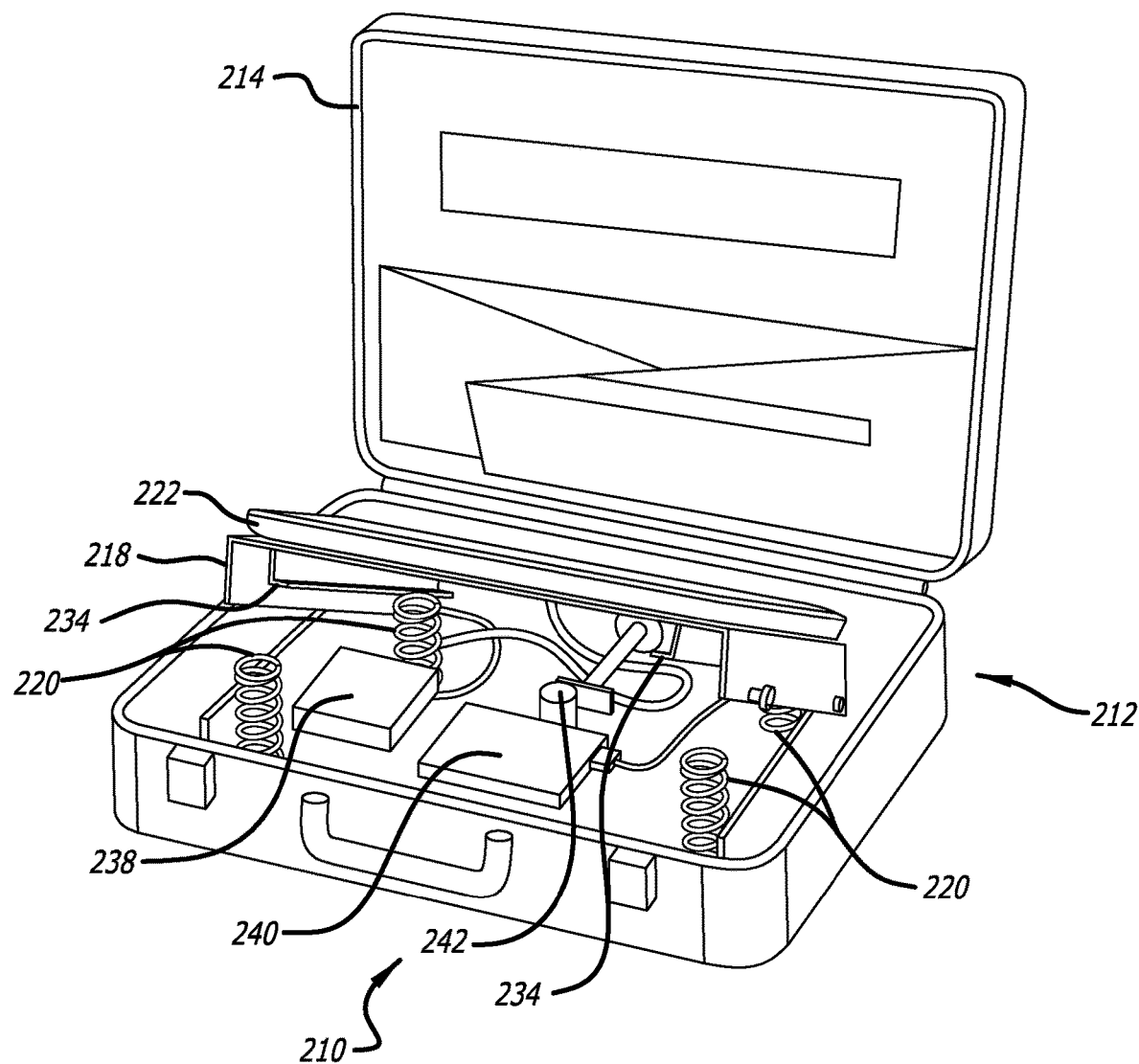
FIGS. 37-40 are isometric views of a portion of the embodiment depicted in FIGS. 34-36 disclosing how the battery can be and is attached to the platform lower surface by brackets and how such additional components as a power supply and an external drive can be incorporated onto the base of the computer case.

Reference to the attachment (indicium 104) of the computer case to its light stand is now made with reference to FIGS. 22-33 in conjunction, for example, with FIGS. 1-7. As shown in FIGS. 22-25, computer stand attachment 104 includes a bracket 106 which is adapted to be secured, indirectly through baseplate 52 of base 48, to the underside of bottom 44 of bottom shell 34 by screws 109 (FIGS. 24 and 25). Computer stand attachment 104 also includes a stand adapter 114 which includes a circular flange 130, an upstanding enclosure 131, and an internal element 114a. Bracket 106 includes a flange 108 into which an opening 110 is provided. Bolts and nuts 107 secure bracket 106, flat baseplate 52, circular flange 130 and bottom shell 34 together into a sandwich arrangement. Opening 110 enables a set screw mechanism 112 to be affixed within flange 108 and its bracket 106 at one end and to upstanding enclosure 131 of stand adapter 114. The set screw mechanism more fully depicted in FIGS. 23-33 includes a plurality of elements comprising a set screw 116, a lock nut 118, three washers 120 and a compression spring 122. Spring 122 is adapted to hold at least one of the washers in place. Stand adapter 114 and set screw mechanism form components on shell 34 underlying platform 50.

As best illustrated in FIGS. 25-29, stand adapter 114 includes a tubular opening 124 for receipt of the light stand 36 and its pole 36a, a threaded hole 126 for receipt of a set screw 116 which bears against internal element 114a. Of importance, tubular opening 124 is purposely not centered within stand adapter 114 but offset as depicted by the spacing denoted by double-headed arrow line 134 so as to provide additional length within the stand adapter for receipt and securement of set screw 116. When light stand pole 36a is fitted within tubular opening 124, set screw 116 is screwed into threaded opening 126 to affix the connection between light stand pole 36a and stand adapter 114.

The tools for screwing set screw 116 into and out of threaded opening 126 include a rod 136 having a knob 138 at its end. Set screw 116 is tubularly constructed with a round hole 140 at one end and a hexagonally-shaped opening 142 at its other end. Rod 136 is shaped with a hexagonal cross-section which is adapted to be insertable into the hexagonally-shaped opening in the set screw. Such mating enables rod 136 to rotate set screw 116 into and out of threaded opening 126. Because of the tubular construction of set screw 116, rod 136 is enabled to have a slidable connection with the set screw.

In addition to all the features described and illustrated above, FIGS. 34-40 illustrate a computer case 210 which in many aspects is similar to that as previously described and illustrated using a 200 indicia identification, e.g., computer case 210 is similarly configured as computer case 10. Computer case 210 includes a shell 212 and lid 214, which lid is appropriately hinged to the shell. Shell 212 includes a bottom 216. A platform 218 is secured to shell bottom 216 and spaced therefrom by a plurality of springs 220 in like manner as previously set forth. A laptop computer 222 is disposed to be attached to the platform, preferably by hook-and-loop fasteners (e.g., Velcro® fasteners) 224 which are exemplified as being configured as strips. A plurality of ventilation openings 226 are formed in platform 218 to aid in the removal of heat from the laptop computer. Bolts 228, like bolts 68, in platform side 260 form pivot points or hinges. Quick release spring-loaded pins 227 couplable with slots 227a in platform side 260 enable platform 218 to pivot about hinge-bolts 228 and provide access to be attained to shell bottom 216 in a like manner as before described and shown.

A fold-out shade 230 is placed in lid 214 and performs like the fold-out shade assembly as before shown and described.

Figure 38:
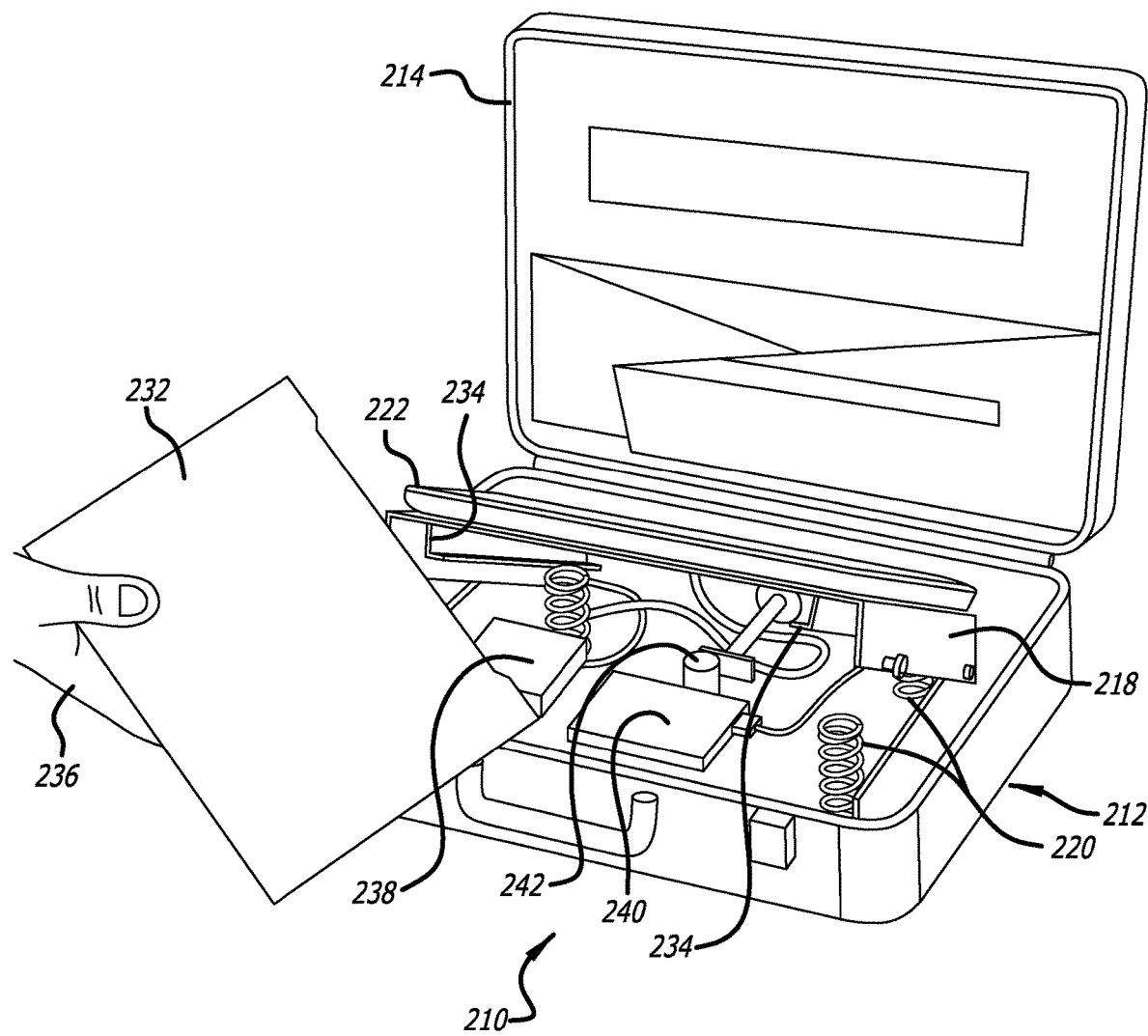
Figure 39:
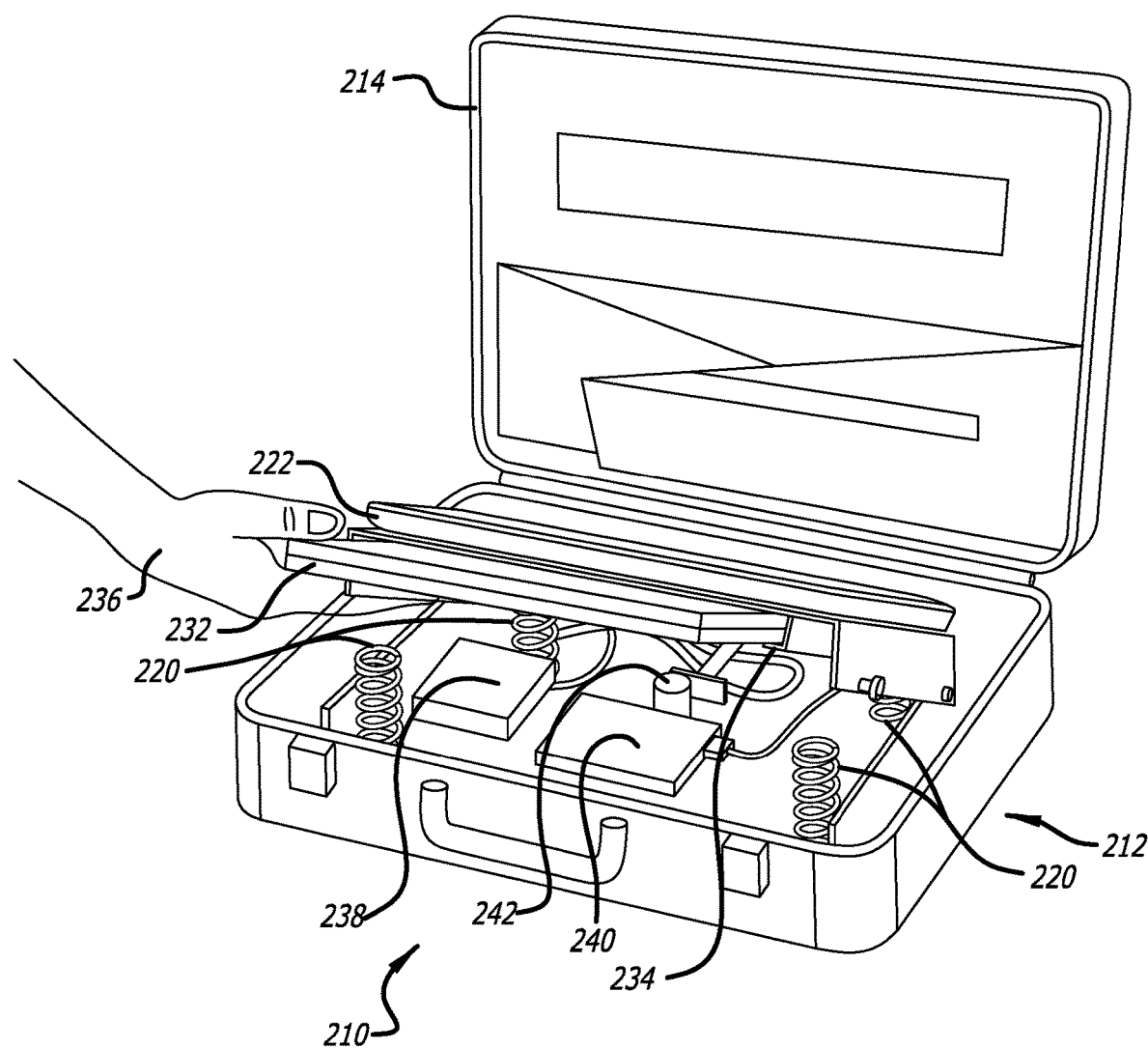
Figure 40:
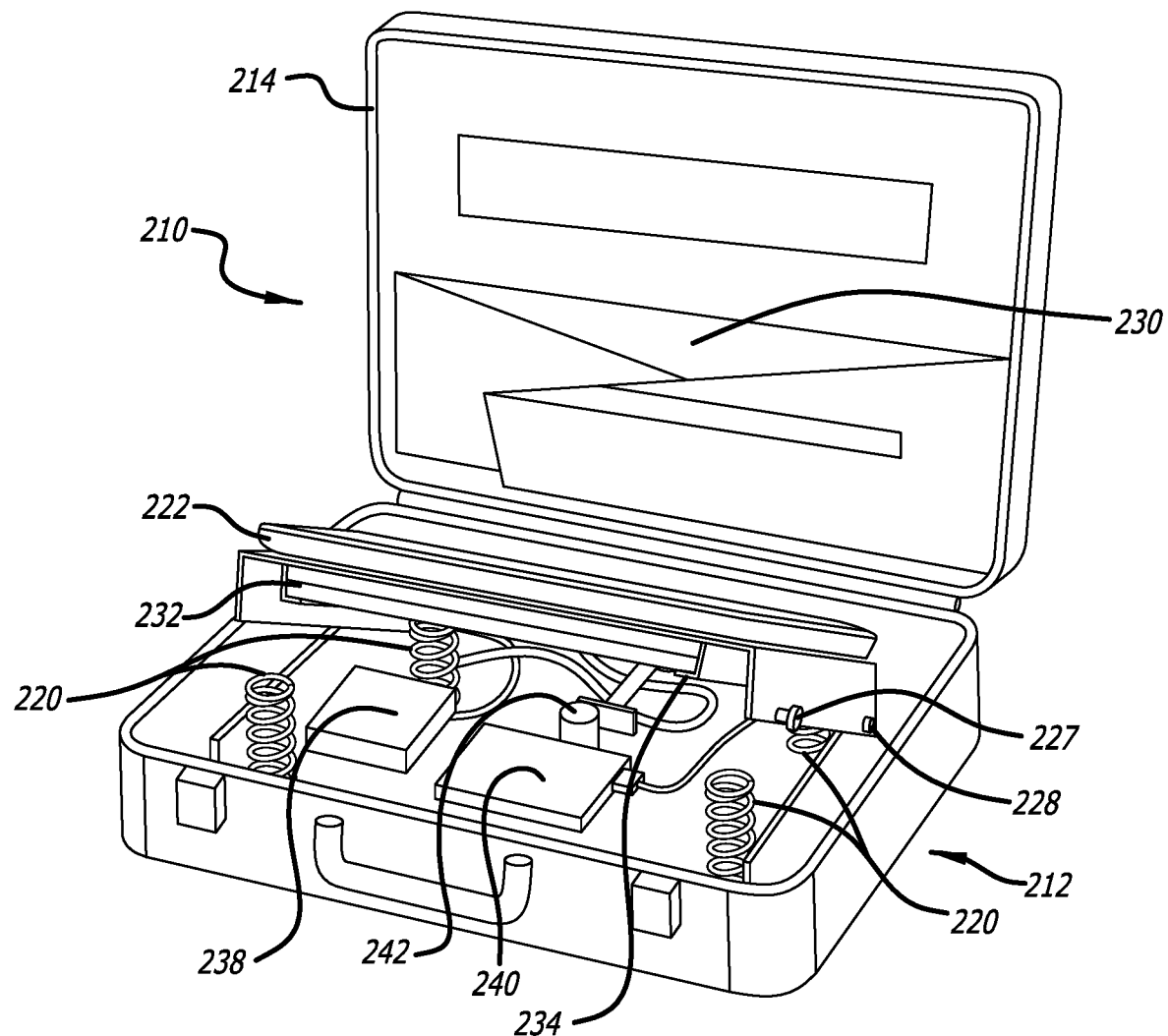

Reference is now directed to FIGS. 37-40 in which case 210 provides for the inclusion of a back-up battery 232. Enablement therefor includes the use of brackets 234 which are secured to the underside of platform 218. Insertion of the battery is depicted as performed by a user's hand 236 (FIGS. 38 and 39).

Case 210 further provides for the addition of further electronic elements, such as a power supply 238 and an external hard-drive 240 which are secured on or otherwise placed on shell bottom 216 or the base of the computer support opposite its platform 218. Like stand adapter 114 and set screw mechanism 112 as described and illustrated in FIGS. 1-29, such electronic components also form components on shell 234 underlying platform 250.

A stand adapter 242 and associated elements are provided within shell 212 (FIGS. 37-40) and an AC inlet 244 (FIG. 34) are also included as described and illustrated in FIGS. 1-33.

Although the invention has been described with respect to particular embodiments thereof, it should be realized that various changes and modifications may be made therein without departing from the spirit and scope of the invention.

What is claimed is:

1. A case for enclosing, transporting, deploying and using a portable computer comprising:
   a bottom shell having a bottom and at least one backside extending from said bottom;
   a lid connected to said bottom shell bottom for closing said bottom shell,
   a platform including a baseplate secured to said bottom of said bottom shell and a flat surface positioned above said baseplate and coupled thereto for at least linear movement therewith onto which said flat surface the computer is securable and, thus thereby, securing the computer to said flat surface;
   springy connections connecting and supporting said baseplate to said flat surface connecting,
   whereby, when the case is closed by said lid and, when the portable computer is secured to said platform, the portable computer is caused to be securely held to said platform within the case by said springy connections.

2. The case according to claim 1
   wherein the portable computer has a screen and
   further including a shade assembly secured to and fully within said lid, said shade assembly comprising a plurality of segments hinged together by hinges which enable said segments to be folded together into and fully within said lid and unfolded out of said lid into a deployed shading condition with end portions of said segments extending into said bottom of said bottom shell so as to enable shading of the computer screen from light ambient to the computer when the portable computer is secured to said platform.

3. The case according to claim 2 wherein said shade assembly comprises a single sheet of material and said hinges comprise creases between adjacent ones of said segments.

4. The case according to claim 3 wherein said bottom shell has sides, and further comprising brackets built into said shell at its sides for enabling a respective said segment to be fitted into a respective said bracket.

5. The case according to claim 4 wherein said segments include and terminate in an end segment which end segment forms a drop-down daylight visor, which drop-down daylight visor includes an interior opening for enabling a user to better view the computer screen from surrounding ambient light and thus to otherwise prevent an other than adequate view of the computer screen.

6. The case according to claim 1 for enabling the inclusion therein of a back-up battery, further including brackets secured to the underside of said platform for enabling the insertion therein of the back-up battery.

7. The case according to claim 1 further including an electrical connection to the computer within said bottom shell.

8. A case for enclosing, transporting, deploying and using a portable computer comprising a case shell, a platform onto which the computer is securable, and springy connections connecting and supporting said platform on said shell including:
   components including electrical and mechanical components placed between said platform and said shell;
   means defining openings in said platform in part for enabling the removal of heat from the computer; and
   connections between said platform and the computer to secure said computer thereto and a hinge coupled to said platform and the computer thereon for enabling said platform and the computer thereon to be swivelled up from said shell and to permit access to said components.

9. The case according to claim 8 wherein said connections comprise hook-and-loop fasteners.

10. The case according to claim 8 wherein said connections include a first connection and a second connection and further including a base secured to said case shell and underlying said platform, a pivot coupling said base to said platform at said first connection and a coupling linking said base to said platform at said second connection, which is spaced from said first connection, said second connection enabling a separation of said platform from said base so as to enable pivoting of said platform with respect to said base about said pivot and to permit the aforesaid access to said components.

11. The case according to claim 8 further including a stand and a light stand pole for supporting said shell and wherein said components include a connection enablement between said shell and said stand.

12. The case according to claim 11 wherein said connection enablement includes a stand adapter enabling connection of said stand to said shell and a mechanism enabling connection and disconnection between said stand and said shell.

13. The case according to claim 12 wherein said stand adapter includes a tubular opening for receipt of the stand and the pole, a set screw, a threaded hole for receipt of the set screw, a circular flange, and a threaded opening placed within the stand adapter for receipt of the set screw.

14. The case according to claim 13 in which said tubular opening is offset and not centered within said stand adapter to provide additional length of said threaded hole within said stand adapter for receipt and securement of the set screw wherein, when said light stand pole is fitted within said tubular opening, said set screw is screwed into said threaded opening to affix the connection between said light stand pole and said stand adapter.

15. The case according to claim 14 wherein said mechanism comprises said set screw, a lock nut, washers and a compression spring which is adapted to hold at least one of said washers in place.

16. The case according to claim 15 wherein said set screw is formed as a cylinder having a hexagonal hole at one end and a round hole in its other end and said case shell has a backside and a rod-supporting fixture, and further including tools enabling said set screw to be screwed into and out of said threaded hole including a rod which is supported in said rod-supporting fixture and which has a hexagonally shaped cross-section sized to engage said hexagonal hole and slidable within said cylinder, wherein said rod, when rotated, enables selected screwing of said set screw into and out of said threaded hole.

17. A case for enclosing, transporting, deploying and using a portable computer having a screen, in which the case comprises a case shell supporting the computer and having a hinge portion and an open portion opposite from said hinge portion, a lid having a hinge hinged to said shell at said hinge portion and having an inside surface, and a shade assembly secured to said lid, said shade assembly comprising a plurality of segments hinged together by hinges which enable said segments to be folded together into said lid and unfolded into a deployed shading condition so as to shade the computer screen from light ambient to the computer,
   wherein said plurality of segments include a first triplicate section coupled to said inside surface of said lid, a second triplicate section secured to said first triplicate section and an end segment comprising a drop-down daylight visor extendable in front of the screen of the portable computer and having an interior opening for enabling a user to view better the computer screen from surrounding ambient light and thus to otherwise prevent an other than adequate view of the computer screen,
   wherein said lid comprises a base with sides extending from said base and towards said case shell, said sides of said base of said lid having dimensions such as to house said shade assembly fully into said lid and within said sides,
   wherein said second triplicate section terminates in an end generally at said open portion of said shell, and
   wherein said drop-down daylight visor with said interior opening is set back from said end of said second triplicate section so that said drop-down daylight visor is within in and thereby shaded by said second triplicate section from light extraneous thereto.

18. The case according to claim 17 wherein said shade assembly comprises a single sheet of material and said hinges comprise creases between adjacent ones of said segments and couplings within said first triplicate section and said second triplicate section.

19. The case according to claim 18 wherein said case shell has sides, and further comprising brackets built into said shell at its sides for enabling a respective said segment to be fitted into a respective said bracket.

20. A case for enclosing, transporting, deploying and using a portable computer comprising a case shell having a shell bottom, a computer support coupled to said shell in which said computer support includes a base coupled to said shell bottom, a platform onto which the computer is securable, springy connections between said platform and said base enabling springy movement between said platform and the computer with respect to said base whereby shocks to the computer are ameliorated, components including electrical and mechanical components on and adjacent to said bottom, and connections between said platform and the portable computer to secure said portable computer thereto and a hinge coupled to the portable computer for enabling the portable computer to be swivelled up from said shell and to permit access to said components.

* * * * *